Patented Sept. 13, 1932

1,876,910

UNITED STATES PATENT OFFICE

OWEN H. GIBSON, OF PORTLAND, INDIANA

BRAKE LINING COMPOSITION

No Drawing.  Application filed October 14, 1929.  Serial No. 399,701.

The object of my present invention, broadly speaking, is the provision of a new and novel composition to be employed in connection with brake-bands of motor vehicles, or the like, the same being simple in character, easily made and applied, highly efficient in its results, and which can be manufactured and sold at a comparatively low price.

More specifically stated, my object is the provision of a semi-fluid composition of materials of low caloric development, that is to say of maximum heat resistance, at the same time of low volatility, not susceptible to moisture, and also by its employment conserving the brake lining, greatly accentuating the gripping and holding qualities thereof, but without abrasion or other deleterious effect to the parts to which it is applied.

Other particular objects and advantages of my invention will be suggested in the course of the following description, and that which is new and useful will be correlated in the appended claim.

My invention contemplates the employment of three chemical elements, or their equivalents, comprising the following: corn oil; petroleum (kerosene); and neats-foot oil. These three elements are combined in approximately the following proportions: corn oil, 85%; kerosene, 10%; neats-foot oil 5%.

The corn oil employed for this purpose is to be of the highest grade, pure, and cold pressed, and which has been reduced to its minimum of condesation and bulk.

Said three elements are miscible together, and integrally united when cold, that is without being heated, and when mixed they form an integral homogenous composite ready for application.

The composition is to be applied to the inner or contact face of the brake lining, whereby it will contact with and be uniformially distributed throughout the said face or surface of the lining by which all of the interstices and inequalities will be filled and the said surface of the brake lining will be made uniform and dense throughout its extent.

The corn oil is the main or basic element of my composition, and it is the gripping or holding element thereof.

The kerosene is simply the solvent element, causing the entire composition to be easily handled and applied in a semi-fluid state, but after being applied it is evident that the solvent will evaporate by reason of its volitility.

The neats-foot oil is merely a lubricant, not only softening the brake band and making it more pliable, but preventing the brake band from gripping the brake drum too suddenly, but more in the nature of a cushioning effect.

After being applied to the brake band, or lining, for a short time the composition, being exposed to the air, becomes ceraceous, but viscid and of the proper consistency to produce the desired braking effect when the brake is applied to the brake lining, as in stopping or slowing down a vehicle.

One of the utilitarian features of my composition, when applied to brake linings, is its ability to withstand a high degree of heat, as when the brakes are applied. In this connection I have found, by repeated experimentations, that it will resist approximately 500 degrees Fahrenheit, of heat above the normal, without deterioration, which of course provides a wide degree of margin for safety.

I desire that it be understood that I am not to be limited to the exact proportions herein stated or to the particular use set forth.

Having now fully shown and described my invention, what I claim and desire to secure by Letters Patent of the United States, is—

A brake lining composition comprising, in approximately the following proportions, corn oil 85%, kerosene 10%, and neats-foot oil 5%, the same being mixed together without heat.

In testimony whereof I have hereunto subscribed my name to this specification.

OWEN H. GIBSON.